Sept. 25, 1951     C. A. HORN     2,569,313
BEARING MOUNTING FOR ROTARY TOOL UNITS
Filed Jan. 16, 1947
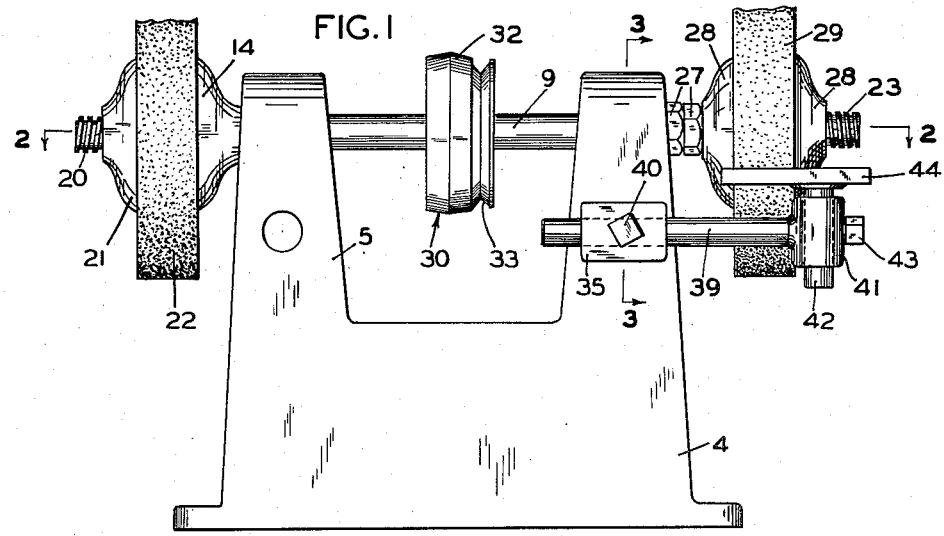
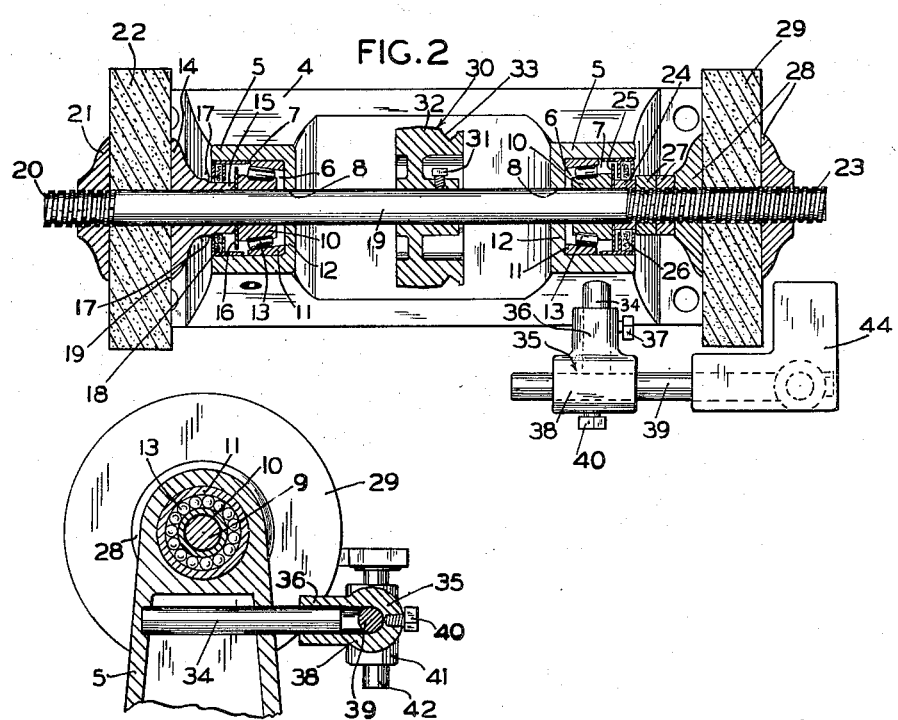
Inventor
CHRIS A. HORN
By Williamson & Williamson
Attorneys Patented Sept. 25, 1951

2,569,313

UNITED STATES PATENT OFFICE 2,569,313

BEARING MOUNTING FOR ROTARY TOOL UNITS

Chris A. Horn, Minneapolis, Minn.

Application January 16, 1947, Serial No. 722,450

6 Claims. (Cl. 308—207)

1

This invention relates to rotary tool units and is particularly adaptable for use in a rotary grinder structure or a rotary saw or the like.

One of the objects of the invention is to provide a rotary tool unit including a support and shaft and a bearing structure for the shaft wherein the play can be eliminated and wherein bearings such as "Timken" roller bearings can be effectively used and easily assembled.

Another object of the invention is to provide an axle thrust member which is adapted to resist end play in one direction along the shaft, wherein the thrust member constitutes a structure fixed on the shaft for rotation therewith and is an integral part of a unit including a tool holder member and a lubricant seal retainer.

Another object of the invention is to provide an improved tool holder for a device such as a rotary grinder or the like.

These and other objects and advantages of the invention will more fully appear from the following description made in connection with the accompanying drawings, wherein like reference characters refer to the same parts throughout the views, and, in which:

Figure 1 is a side elevational view of an embodiment of the invention;

Figure 2 is a horizontal longitudinal sectional view taken approximately on the line 2—2 of Figure 1; and Figure 3 is a fragmentary transverse vertical sectional view taken approximately on the line 3—3 of Figure 1.

The structure includes a base member 4 having a pair of spaced upstanding support arms 5. Each of the arms 5 is provided with a horizontally axial aperture 6 having an enlarged portion 7 and a reduced portion 8. A shaft 9 of uniform diameter throughout its length extends through the aperture 6 in the upwardly extending supports 5. Lying in each of the apertures 6 and about the shaft 9 is an inwardly concentric bearing portion 10 and an outer portion 11, the latter relatively closely fitting the enlarged part 7 of the aperture 6 and having its inner side bearing against a shoulder 12 formed by the reduction of each of the apertures 6. Roller bearing elements 13 lie between the concentric bearing elements 10 and 11 which provide a raceway for the rollers 13. It will be seen from Figure 2 that the inwardly concentric bearing portion 10 is spaced outwardly from the shoulder 12 formed in the support 5.

In the left-hand side of Figure 2 there is shown a member 14 having an inwardly facing end portion 15 constituting a thrust member and between said thrust member 15 and the inner bearing element 10 is a thrust plate or shim 16.

Also formed on the member 14 and outwardly of the thrust member portion 15 is a shoulder 17 which is adapted to retain a suitable sealing ring unit 18, the latter fitting the inner wall of the aperture 6 and also being in contact with the shaft 9 to retain lubricant for the bearing structure in the aperture 6.

Further outwardly on the member 14 which is fixed to the shaft 9 an outwardly directed tool engaging face 19 is formed. The left hand end of the shaft 9 is threaded as at 20 to receive a threaded tool clamping member 21 which is adapted to secure a grinding wheel 22 or other suitable tool between itself and the tool holding portion 19 of the member 14. The right hand upwardly extending support 5 and its aperture 6 are shown containing a bearing unit of the same structure as that shown in the left hand side of the device. The right hand end of the shaft 9 is threaded as at 23, the threads extending inwardly approximately to the outer or right hand end of the right hand aperture 6. A collar 24 is located on the shaft 9 at the inner end of the threaded portion 23 and a thrust plate or shim 25 is disposed between the collar 24 and the outer side of the inwardly concentric bearing member 10. A lubricant sealing ring unit 26 is positioned between the inner wall of the aperture 6 and the collar 24.

Outwardly of the collar 24 and on the threaded portion 23 of the shaft 9 is a pair of cooperating lock nuts 27 which are adapted to be drawn up against the collar 24 to exert inward thrust against the collar, the thrust plate 25 and the inwardly concentric bearing member 10. Outwardly of the lock nuts 27 are cooperating tool clamping members 28 similar in structure to the tool clamping or holding member 21 on the left hand end of the shaft. These members 28 are adapted to clamp a rotary grinding stone 29 or other rotary tool between them.

Between the upwardly extending supports 5 the shaft 9 has a pulley 30 mounted thereon and secured by a set screw 31. The pulley 30 has a flat belt receiving surface 32 and a V belt groove 33 so that the shaft 9 can be driven by either type of belt.

The structure described above is one which affords relatively inexpensive and easily assembled utilization of a tapered roller bearing structure of the type illustrated, and the structure is such that end play can be eliminated and/or overcome with ease. Furthermore, another important feature of the invention is that it provides a bearing and shaft unit in which end play is eliminated and wherein an ordinary straight shaft without shoulders can be utilized. The shaft need not be machined to different diameters as is customary where thrust shoulders are required, and furthermore I provide at the left hand end of the shaft, as seen in the drawing, a single member fixed to the shaft which serves as a tool clamping member, a lubricant sealing ring retainer and a bearing thrust member. By reason of these various features of construction a highly efficient and long lasting tool can be made relatively inexpensively.

In the drawing there is also illustrated a tool support. This includes a transverse round bar 34 which extends through the right hand upwardly extending support arm 5 and has a T-shaped member 35 mounted on one end thereof. The bar 34 is preferably fixed in the support 5. The inwardly extending arm 36 of the T-shaped support 35 is provided with a set screw 37 to secure it to the bar 34. The cross head 38 of the member 35 has a bar 39 passing therethrough and adjustably retained by a set screw 40. The right hand end of the bar 39 has a vertically axial sleeve 41 thereon to slidably receive a short vertical bar 42 which is held by a set screw 43. The upper end of the bar 42 has an angle plate 44 mounted thereon and, as best shown in Figure 2, the plate 44 is adapted to lie close to the outer flat side and rounded peripheral edge of the grinding wheel 29.

The tool support is capable of being tilted about the horizontal axis of the transverse bar 34 and it can be shifted toward and away from the outer side face of the stone 29 by releasing the set screw 40. Furthermore, the angle plate 44 can be swung about a vertical axis by releasing the set screw 43 and at the same time can be raised and lowered relative to the rotational axis of the stone 29. As a result a tool can be supported on the angle plate 44 at various angles and positions relative to the stone 29.

It should be noted that the angle plate 44 of the tool support can be adjustably positioned so that one leg of the plate can be swung and extended inwardly alongside the inner face of the stone 29 so that the opposite side of the stone can be used if desired.

It will, of course, be understood that various changes may be made in the form, details, arrangement and proportions of the various parts without departing from the scope of my invention.

What I claim is:

1. In a rotary tool unit, a support having an aperture therethrough, a shaft extending through said aperture, at least a portion of said aperture being considerably larger than said shaft, a bearing structure comprising relatively rotatable and axially tapered complementary portions, a member fixed on said shaft and having a portion of larger diameter than that of said shaft to provide an inwardly facing thrust member for one side of one of said bearing portions, said shaft having a threaded portion at the opposite side of said support from said fixed member, and a nut on the threaded portion of said shaft in thrust receiving relationship to the other side of a complementary bearing portion.

2. The structure in claim 1, and said shaft having a constant diameter throughout its length.

3. The structure in claim 1, and said fixed member including a portion lying axially outwardly of its thrust member portion and constituting a tool holder element.

4. In a rotary tool unit, a support having an aperture therethrough, a shaft extending through said aperture, a bearing in said aperture and about said shaft and comprising relatively rotatable and axially tapered complementary concentric portions, a pair of cooperating tool clamping members on said shaft, one of said tool clamping members being fixed to said shaft and having a portion about said shaft providing an inwardly facing thrust member for one of said bearing portions, said last mentioned tool clamping member having a portion lying axially outwardly of its thrust member portion and having an outwardly disposed tool holding face, and said last mentioned tool clamping member having an inwardly facing shoulder thereon between said tool holder element and said thrust member portion to provide a retainer for a lubricant sealing ring.

5. In a rotary tool unit, a support having an apertured portion, a shaft extending through said apertured portion and having an outwardly extending threaded end, said apertured portion having reduced portions forming abutments spaced inwardly from each end thereof, a bearing in each end of said apertured portion comprising relatively rotatable and axially tapered complementary concentric parts, one each of said parts lying against one of said abutments, the others of said parts being spaced axially outwardly from said abutments, a member fixed on said shaft axially outwardly of one end of said apertured portion and having a thrust member portion facing inwardly against one of the second mentioned of said bearing parts, said fixed member being at the opposite end of said shaft from the threaded end thereof, and a nut on the threaded end of said shaft in thrust receiving relationship to the other of said second mentioned of said bearing parts.

6. The structure in claim 5, and said fixed member having a portion lying axially outwardly of its thrust member portion and constituting a tool holder element.

CHRIS A. HORN.

REFERENCES CITED

The following references are of record in the file of this patent:

UNITED STATES PATENTS

| Number | Name | Date |
| --- | --- | --- |
| 1,266,310 | Pfanstiehl | May 14, 1918 |
| 1,455,213 | Larsson | May 15, 1923 |
| 1,567,018 | Amsden | Dec. 22, 1925 |
| 1,736,972 | Hutchinson | Nov. 26, 1929 |
| 1,849,284 | Davies | Mar. 15, 1932 |